March 28, 1950 R. W. RITZERT 2,501,853

STATION SELECTOR FOR RADIO APPARATUS

Filed Oct. 30, 1947 8 Sheets-Sheet 1

INVENTOR.
Robert W. Ritzert

BY Moses, Nolte, Crews & Berry
ATTORNEYS

March 28, 1950 R. W. RITZERT 2,501,853

STATION SELECTOR FOR RADIO APPARATUS

Filed Oct. 30, 1947 8 Sheets-Sheet 2

INVENTOR.

Robert W. Ritzert

BY Moses, Nolte, Crews & Berry

ATTORNEYS

March 28, 1950 R. W. RITZERT 2,501,853

STATION SELECTOR FOR RADIO APPARATUS

Filed Oct. 30, 1947 8 Sheets-Sheet 3

INVENTOR.

Robert W. Ritzert

BY Moses, Nolte, Crews & Berry

ATTORNEYS

March 28, 1950 R. W. RITZERT 2,501,853

STATION SELECTOR FOR RADIO APPARATUS

Filed Oct. 30, 1947 8 Sheets-Sheet 4

INVENTOR.
Robert W. Ritzert
BY Moses, Nolte, Crews & Berry
ATTORNEYS

March 28, 1950 R. W. RITZERT 2,501,853

STATION SELECTOR FOR RADIO APPARATUS

Filed Oct. 30, 1947 8 Sheets-Sheet 5

INVENTOR.

Robert W. Ritzert

BY Moses, Nolte, Crews & Berry

ATTORNEYS

March 28, 1950 R. W. RITZERT 2,501,853

STATION SELECTOR FOR RADIO APPARATUS

Filed Oct. 30, 1947 8 Sheets-Sheet 6

INVENTOR.

Robert W. Ritzert

BY Moses, Nolte, Crews & Berry

ATTORNEYS

March 28, 1950 R. W. RITZERT 2,501,853

STATION SELECTOR FOR RADIO APPARATUS

Filed Oct. 30, 1947 8 Sheets-Sheet 7

INVENTOR.
Robert W. Ritzert
BY Moses, Nolte, Crews & Berry
ATTORNEYS

March 28, 1950 R. W. RITZERT 2,501,853

STATION SELECTOR FOR RADIO APPARATUS

Filed Oct. 30, 1947 8 Sheets-Sheet 8

INVENTOR.

Robert W. Ritzert

By Moses, Nolte, Crews & Berry

ATTORNEYS

Patented Mar. 28, 1950

2,501,853

UNITED STATES PATENT OFFICE 2,501,853

STATION SELECTOR FOR RADIO APPARATUS

Robert W. Ritzert, New York, N. Y., assignor to The Hammarlund Manufacturing Company, Inc., New York, N. Y., a corporation of New York Application October 30, 1947, Serial No. 783,207

11 Claims. (Cl. 192—142)

This invention relates to means for mechanically controlling rotation of a rotor to any one of a series of precisely determined, preselected positions. Such means may be adapted for a variety of uses. A conspicuous use and the one for which the illustrative apparatus was primarily contrived is found in a push-button tuner for radio apparatus. For illustrative purposes, therefore, the invention will be described as embodied in a push-button tuner for radio apparatus.

The illustrative apparatus discloses an automatic station selector mechanism adapted for use in the ultra high frequency field, for tuning in television and frequency modulation stations. This apparatus will be described herein with special emphasis upon ultra high frequency use because it embodies features which give it a special adaptability for meeting the exacting requirements of such use.

The band widths assigned to television and frequency modulation stations run from 44 to 216 megacycles, a very wide range. In order automatically to effect preset tuning, where such a wide range is covered, it is necessary that a setting be accurate to within a very small fraction of 1% of the range covered. To the attainment of this end, it is important that the tuning mechanism have extensive movement, and that the station selector which measures and arrests the operation of the tuning mechanism also have extensive movement and be capable of very precise setting.

It is an important object of the present invention to provide a tuning motor for driving the tuner in combination with operated stops and non-operated but settable stops which may arrest operation of the tuner in various desired positions, the former stops being carried by large rotary members which are driven in common with the tuner and through a wide range of movement in covering the full range of tuner operation.

It is a feature of the invention that the operated stops are positively driven in common with and in proportion to the tuner drive, but are carried by rotary members which are adapted to be declutched for resetting.

It is a further feature of the invention that each settable stop when set is yieldingly biased into the path of the cooperative operated stop, and is provided with an abrupt arresting surface for engaging the operated stop in one direction of rotation of the latter and with a cam surface adapting it to be cammed aside by the operated stop in the opposite direction of rotation.

It is a further feature of the invention that vernier adjusting mechanisms are provided for precisely adjusting the effective positions of the stops of one set, so that the limits of movement determined by the cooperation of the stops can be precisely determined.

It is a still further feature that mechanism is provided which acts automatically upon the actuation of a station selector key to operate the motor backward to a limit position in which the tuner is at one limit of its range of operation and all the operated stops are in back of the effective positions of their cooperative non-operated stops, then to reverse the motor for driving the tuner and the operated stops forward to select a station, and finally to open circuit and arrest the motor as an incident of the arresting of the tuner and stop mechanism by the particular settable stop which is set in effective position.

It is an important feature of the invention that although the operated stop carriers and the tuner are connected for concurrent and uniformly proportional operation without slipping, provision is made for permitting the motor to overthrow when the tuner and the stop mechanism are abruptly arrested. As soon as a pair of cooperative stops becomes effective, the motor is open-circuited and the connection from the motor to the tuner and stop operating mechanism becomes a frictional drive connection, so that the momentum of the motor as the motor is brought to rest urges the operated stop against the cooperative settable stop. In this way the violence of the blow when the stops engage is relieved, and any tendency toward rebounding is overcome.

Other objects and advantages will hereinafter appear.

In the drawing forming part of this specification

Before proceeding with a detailed description of the illustrative mechanism, the principal parts and their functions will be briefly pointed out.

Figure 1:
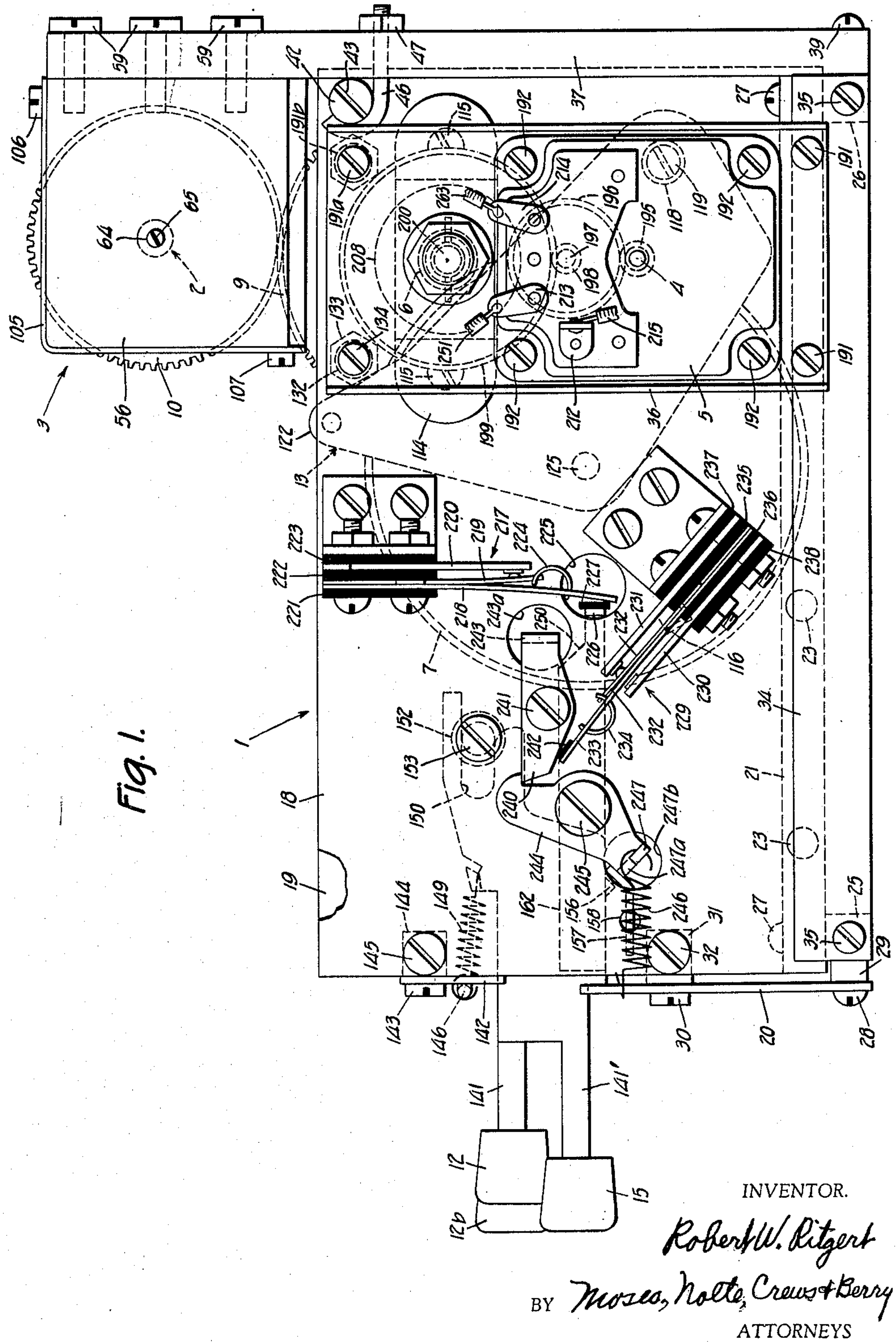
Fig. 1 is a fragmentary view in side elevation of station selector and tuner mechanism embodying features of the invention the parts being shown in a station selected condition.

A station selector unit 1, Fig. 1, is connected to drive the settable shaft or rotor 2 of an inductance tuning unit 3. The output shaft 4 of a shaded pole reversible A. C. motor 5 is connected to drive a long pinion 6 which forms a part of the unit 1 (see Fig. 4 also). The pinion 6 is normally in mesh with a timing gear 7 and with stop carrying gears 8 to 8*h*, inclusive. The pinion 6 is also connected through gears 9 and 10 (Figs. 1 and 3) to drive the tuner shaft 2.

The gears 7 and 8 and 8*a* to 8*h* as well as the tuner shaft 2 are normally positively driven by the pinion 6, so that the gears and their stops are operated in unison with one another and in proportion to the tuner without the possibility of slipping. The stops on the various gears are disposed in different angular positions. The stops carried by gears 8 to 8*h*, respectively, are cooperative with corresponding settable stops 11 and 11*a* to 11*h*, inclusive, which stops are selectively and alternatively set in effective positions by station selecting keys 12 and 12*a* to 12*h*.

Without going into detail at the moment, the principle of operation of the mechanism may be briefly indicated. When a station selecting key such as 12 is thrust rearward, as in Fig. 2, it releases any station setting key that may previously have been operated, and itself remains engaged and held in a rearward position. At the same time, it causes the stop 11 to be displaced rearwardly in an effective position and to be yieldingly held in such position so long as the key is not returned to its normal, ineffective position.

At the time when the stop 11 is thrust rearwardly, the mechanism may be in any angular position within the operative range through the previous selection of any station or through manual tuning, so that some of the gear carried stops may be located in advance of arresting position, and others may be located behind the arresting position. The cooperative stops are adapted properly to select the station only by arresting operation of the stop carrying gears in a forward (counterclockwise) direction, as the gears are viewed in Fig. 2.

Since the tuner 3 has only a limited range of movement, unlimited, unidirectional rotation of the stop carrying gears is not feasible. It is important, therefore, that all of the station selecting gear carried stops be located behind or clockwise from the stop arresting position as the parts are viewed in Fig. 2 before they are carried forward for actually effecting station selection. The stops 11 and 11*a* to 11*h* are accordingly arranged so that they can be cammed aside by the gear carried stops as the gears are operated clockwise, but so that they may intercept and arrest the gear carried stops when the gear carried stops are driven counterclockwise.

Figures 11, 12, 13:
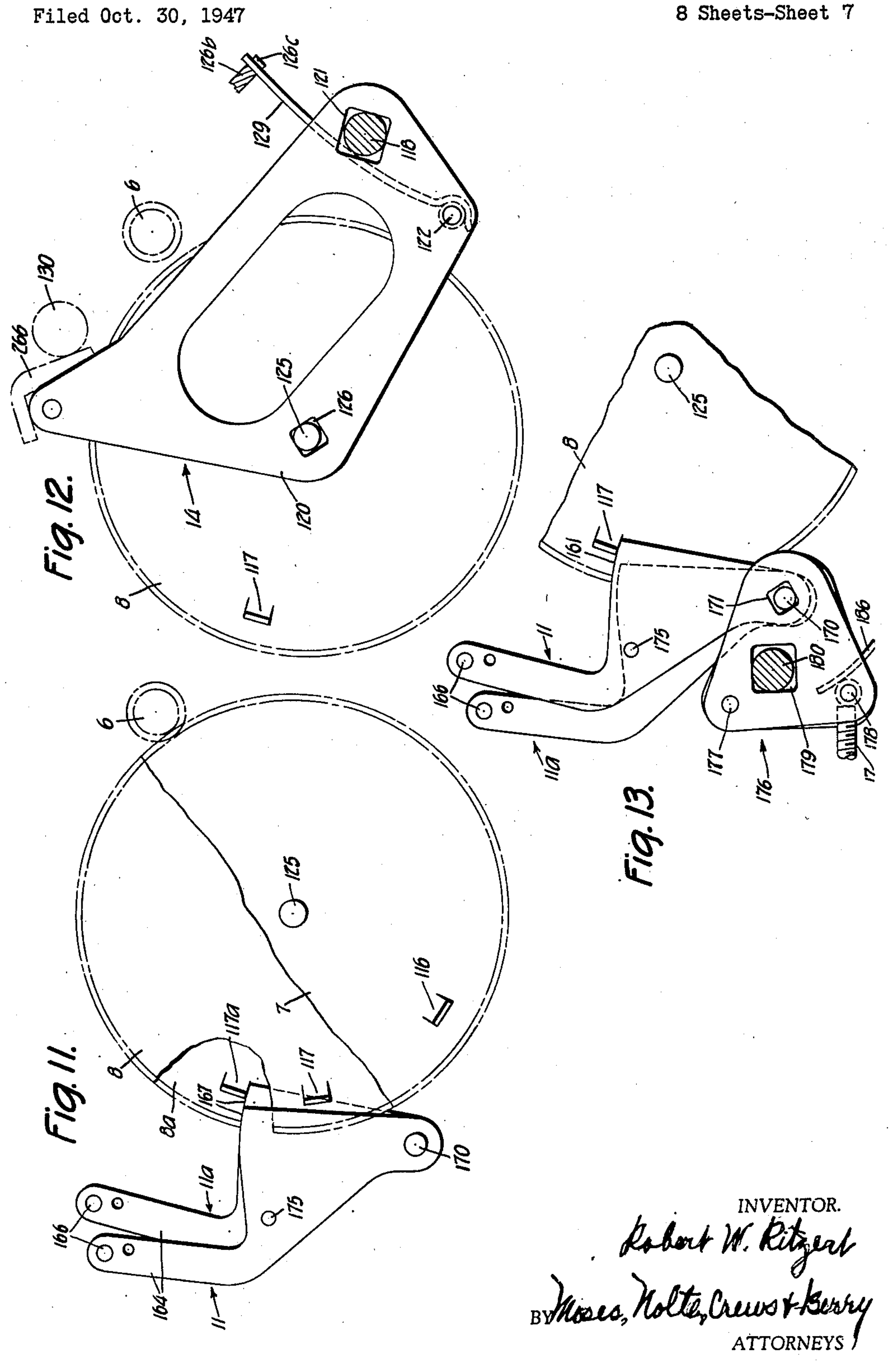
Fig. 11 shows the stop carrying gears driven in a counter-clockwise direction after reversing the motor and arrested by the settable and operated stops associated with the second key of Fig. 8.
Fig. 12 is a fragmentary sectional detail view illustrating principally the mounting of the stop carrying and timing gears.
Fig. 13 is a fragmentary sectional detail view showing a pair of the settable stops, the carriers therefor, and vernier adjusting mechanism for the carrier.

When a station selector key is thrust rearward (as in Fig. 8), the motor is set into operation to drive the stop carrying gears in a clockwise direction until the tuner has been driven to one limit of its movement. At that point an abutment carried by the timer gear 7 causes the motor to be reversed (Fig. 10), so that the timer and the stop carrying gears are driven in the opposite direction until the settable stop which is interposed in the path of its cooperative gear carried stop intercepts the latter stop and arrests the forward or counterclockwise operation of the gears (as in Fig. 11), thereby arresting the tuner at a definite, predetermined frequency.

The stop carrying gears are individually mounted in rockable carriers, the gear 7 being mounted in a carrier 13 and the gears 8 and 8*a* to 8*h* being mounted in carriers 14 and 14*a* to 14*h*, respectively (Figs. 2, 4, 7 and 12). All the carriers are pivotally mounted and are spring urged in a direction to cause the gears carried by them to mesh with the long pinion 6.

A manual tuning key 15 is provided (Figs. 1, 3, 4 and 14) whereby all of the station selecting keys are restored to normal positions, and all the settable stops are withdrawn and rendered ineffective. The manual tuning key, itself, is returned to normal, ineffective position by the actuation of any station selecting key to set a station selecting stop.

When it is desired to set the station selector mechanism to bring in a particular station by the actuation of a particular selecting key, the manual tuning key is first depressed, and a manual tuning knob 16 (Fig. 3) is then turned to run the timing gear 7 backward, clockwise in Fig. 1, to its rearward limit of movement, at the same time operating the tuner to one of its limits of movement.

The station selector gear whose train is to be used for selecting the particular station is then declutched (as in Fig. 12, with the pinion 6), being held out of mesh a short distance by a thin spacer inserted between the gear carrier and a stationary part of the selector unit frame, and the manual tuning knob is then operated to tune in the desired station. The selected stop carrying gear is then rotated manually relative to the pinion 6 to carry its stop as nearly as can be judged into the arresting position, that is to say, into position to engage its cooperative settable stop, if the latter were at the moment set in effective position.

The spacer is then removed and the gar is allowed to reengage the pinion 6. The selected key associated with the gear chosen is then thrust rearward, and the mechanism goes through its usual cycle with the gear carried stop which has just been set cooperating with its settable stop to determine the final position of the parts.

If it is found that the station is not tuned in to the best advantage, the cooperative settable stop may be adjusted in position by a vernier adjusting screw of which ten are provided, one for each station selecting train, these screws being designated, respectively, 17 and 17*a* to *h*, inclusive.

With this general understanding of the setting up and operation of the mechanism, the detailed description which is to follow will be readily understood.

Figure 3:
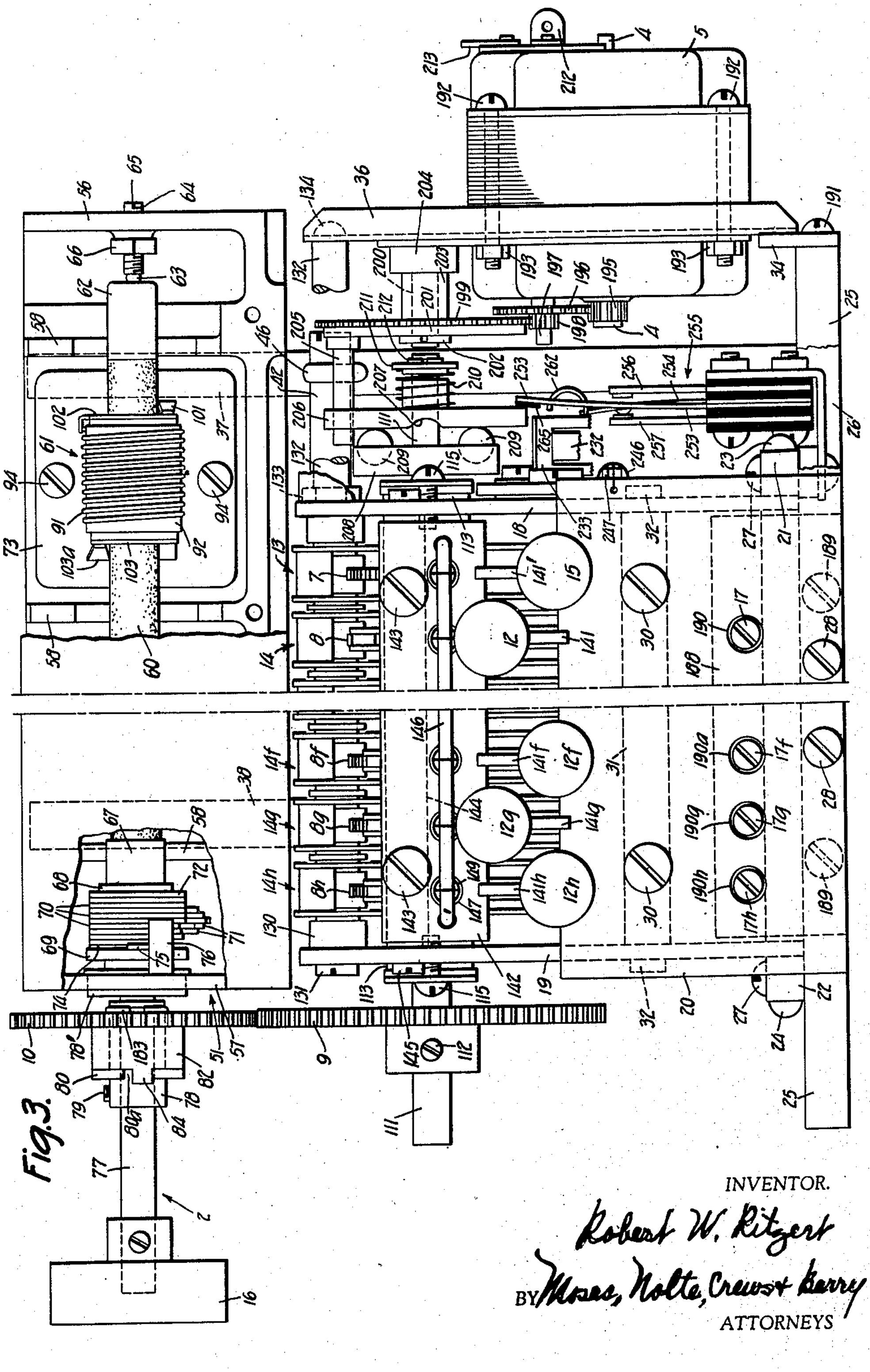
Fig. 3 is a fragmentary view in front elevation, partly broken away, and cut away intermediate its ends for compactness of illustration, showing the mechanism of Figs. 1 and 2.
Figure 4:
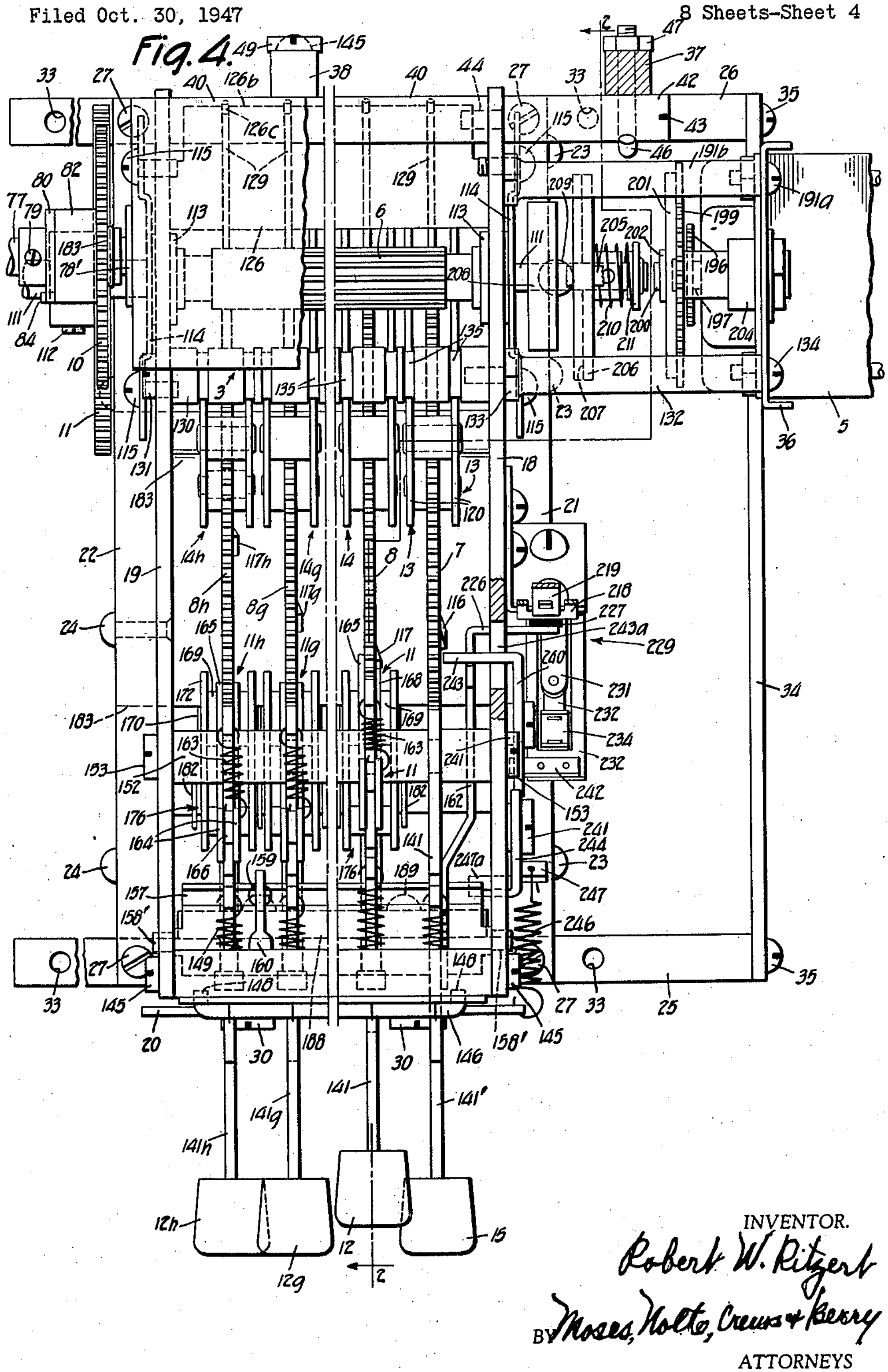
Fig. 4 is a fragmentary plan view, partly broken away, and cut away intermediate its ends, of the mechanism of Figs. 1 to 3.

The station selecting unit 1 includes a frame which comprises side plates 18 and 19 and a front plate 20 (Figs. 1, 3 and 4). The frame is desirably made very rigid in order to eliminate unwanted play, thereby to insure precise operation of the parts. Frame bars 21 and 22 are secured, respectively, to the plates 18 and 19 by rivets 23 and 24, while cross bars 25 and 26 are arranged to interconnect the bars 21 and 22 and to protrude beyond them at the front and rear of the unit, being secured to the bars 21 and 22 by screws 27. The front plate 20 is secured to the cross bar 25 by screws 28 which are passed through the plate 20 and through spacing collars 29 and are threaded into the bar 25. The plate 20 is also secured by screws 30 to a cross bar 31, which extends between the plates 18 and 19 at the forward ends of the latter, and is secured to the plates by screws 32. The cross bars 25 and 26 are formed with openings 33, through which screws or other fastenings may be inserted for attaching the unit to the chassis of a receiving set.

A bar 34 extends from front to rear of the unit, being connected to the right hand ends of the bars 25 and 26 by screws 35 (Figs. 3 and 4). The bar 34 forms a part of the structure for supporting a motor carrying plate 36. Additional tie members are provided between the side plates 18 and 19. Since these members serve additional functions in connection with specific mechanisms to be described, they will not be described at this point, but will be referred to incidentally in connection with the description of the mechanisms with which they are associated.

Upright bars 37 and 38 at the rear of the machine (Figs. 1, 2, 3 and 4) are attached to the bar 26 by screws 39. A rectangular tie rod 40 extends between the plates 18 and 19, being secured to the plate 19 by a screw 41 and to the plate 18 by what may be termed a screw 42. The screw 42, however, might be more accurately termed a round rod having a screw-driver slot 43 in one end and a short, reduced, threaded portion 44 (Fig. 4) at the other end. The upright bar 38 is secured to the rod 40 by a screw 45. The upright rod 37 is secured to the rod 42 by a hook 46 (Figs. 1 and 4). The hook 46 partially embraces the round rod 42, and has a threaded stem portion which extends rearwardly through the upright rod 37. A nut 47 threaded on the stem of the hook 46 draws the hook rearwardly, and causes the rod 42 to be firmly clamped between the forward end of the hook and the upright rod 37.

The upright rods 37 and 38 extend above the selector unit 1 to support the tuner unit 3.

The tuner unit 3 as herein illustrated comprises a casing member 51 in the form of a casting (Fig. 1). As shown, the member 51 has a solid bottom wall 52, an upright rear wall 53 formed with openings 54 for a purpose which will be described, and with end walls 56 and 57 (Fig. 3). The casing member 51 is also provided with a series of partitions or shields 58. The casing member 51 is secured to the posts 37 and 38 by screws 59.

The tuner includes a ceramic shaft section 60 (forming part of shaft 2), upon which several variable inductance units 61 are made fast (Fig. 3). The rod is provided at the right hand end thereof with a brass cap 62 in the end of which a steel bearing ball 63 is seated. A set screw 64 threaded through the wall 56 is formed with a screw-driver slot 65 in one end, and has a recess in the opposite end for receiving the ball 63. The set screw 64 is adjusted so as to cause the ball to support the adjacent end of the shaft and to align the shaft axially with the screw. A lock nut 66 is provided for retaining the screw 64 in adjusted position.

At the opposite end of the shaft section 60 provision is made of a metallic sleeve 67 which is fixed on one end of the shaft section and serves as an extension thereof. The sleeve is provided with flanges 68 and 69 between which a series of discs 70 (Figs. 2 and 3), each having a single finger 71, are mounted with freedom for rotation relative to one another and relative to the sleeve.

An end disc 72 of the series also has a finger 71. The disc 72 is made fast with the sleeve so that it is positively driven by and with the sleeve 67 and the shafts 60. Each of the fingers 71 overlaps its neighbors in the direction of the length of the shaft. One of the discs 74, at the opposite end of the series from the disc 72, carries a finger 75 which is longer than the others. The finger 75 is adapted to be arrested by engagement with a rod 76 which extends inward from the end 57 of the casing member 51. The device made up of the discs 71, 72 and 74, together with their fingers is a well known structure for defining a prescribed range of angular movement covering several revolutions. When the tuner is at its clockwise limit of movement the finger 75 engages under the rod 76.

Figure 2:
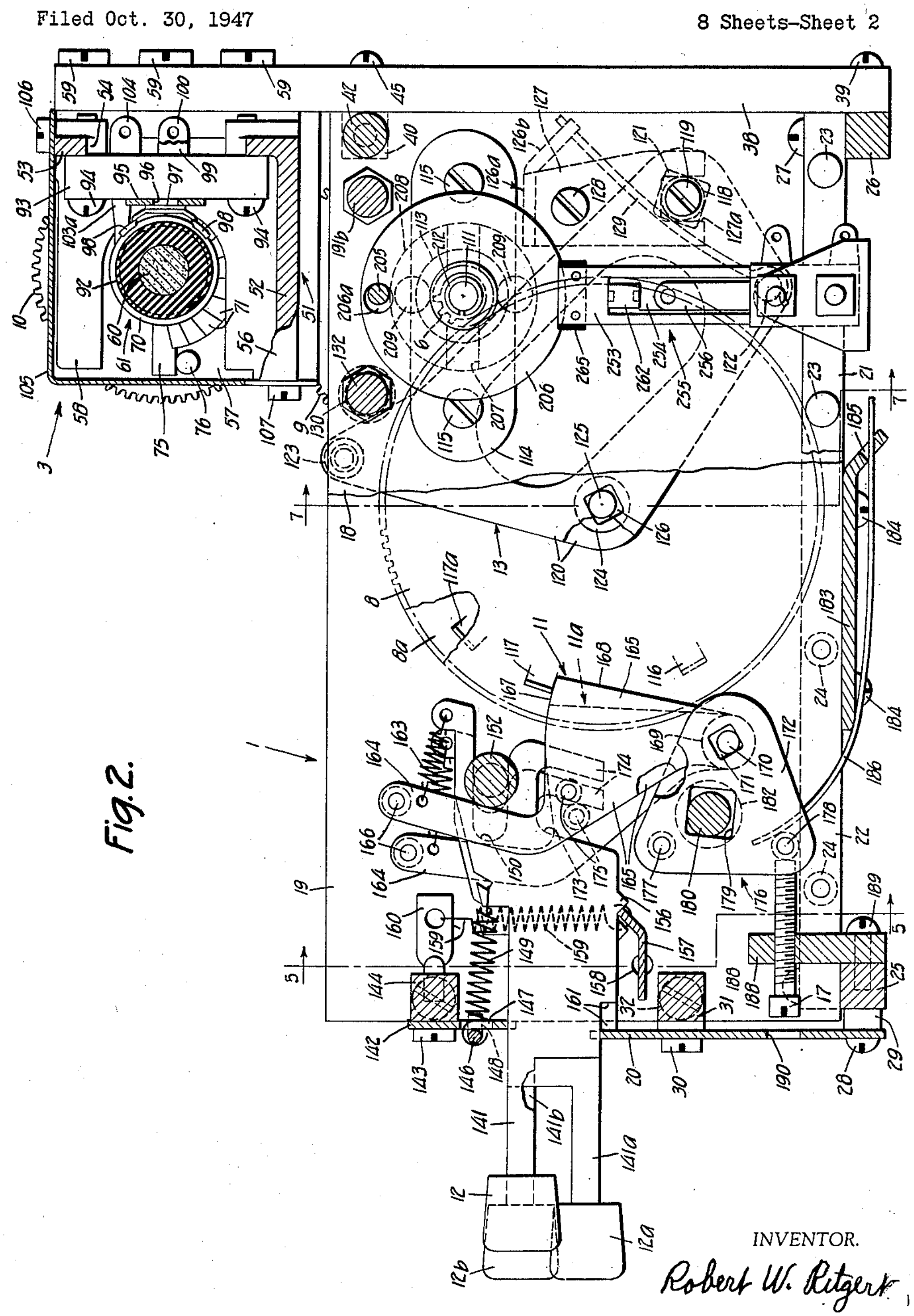
Fig. 2 is a sectional view in elevation taken upon the line 2—2 of Fig. 4 looking in the direction of the arrows, the parts being shown in the same condition as in Fig. 1.

When the shaft 60 is turned from its clockwise limit in a counter-clockwise direction as viewed from the right hand end of the device (Figs. 2 and 3), the finger 75 is carried out of engagement with one side of the rod 76 and into engagement with the opposite side of the rod, by which it is positively arrested as in Fig. 2. The first or adjacent disc 70 can turn counter-clockwise almost a full revolution relative to the disc 74 before its finger 71 is obstructed and arrested by a lateral projection on the finger 75. The second disc 70 can similarly turn nearly a full revolution relative to the first before its finger 71 is obstructed and arrested in a similar manner. Each disc adds nearly a revolution to the available range of movement. The total amount of rotation permitted shaft 60 is the sum of the lost motion of the discs relative to one another. In the present instance, the device is designed to permit the shaft 60 to be rotated through a range of ten full turns.

The sleeve 67 is fast with a metallic shaft section 77 (Fig. 3), which is rotatably mounted in a bearing 78' carried by the end 57 of the casing member 51. The shaft section 77 carries a sleeve 78 which is secured in fixed position upon the shaft section by one or more set screws 79. The sleeve 78 is formed with a notched flange 80. The sleeve extends through the gear 10, including a hub 82 which is unitary with the gear. The gear is rotatably mounted upon the sleeve, being held in place on the sleeve and against the flange 80 by a split ring 83, which bears laterally against the gear 10, and engages with spring pressure in a groove formed in the sleeve 78.

The gear hub 82 is formed with a tongue 84 which extends into the notch 80*a* of the flange 80 with clearance to permit lost motion of the gear relative to the shaft 77. The provision of this lost motion does not detrimentally affect the accuracy of setting of the shaft 77. On the contrary, it serves to prevent disturbance of the accurate setting that might be caused by vibration of the effective settable stop. Vibration of the set stop, or vibration transmitted to the set stop tends to operate the gear 81 a short distance in the reverse direction from that in which it was being driven in the selection of a station. The shaft 77 has, of course, been driven in unison with the gear 10 up to the point of station selection. Should the gear, because of vibration, be driven a short distance in the opposite direction, it is important that the gearing alone be caused to shift in the opposite direction, without compelling the gear 77 to turn with it and thereby disturb the tuning which has been correctly effected.

Another factor tending to disturb the setting is vibration of the tuner frame 51 relative to the frame of selector 1. The frame structures are made as rigid as possible throughout in order to reduce vibration and to avoid objectionable play of the parts. Complete freedom from vibration is, of course, unattainable. Vibration of frame 51 which tends to turn the gear 10 in a forward (counter-clockwise) direction is arrested by the set stop which arrested the forward operation of the tuner. Vibratory movement in that direction does not, therefore, disturb the tuning more than momentarily. Movement of the gear 10 in the opposite direction is not opposed, however, and vibration tending to produce such movement would cause the tuner to be permanently displaced from the desired setting if the lost motion connection were not provided between the gear 10 and the tuner shaft.

There are as many of the variable inductance units 61 upon the shaft 60 as there are circuits to be tuned in the receiver. In the illustrative apparatus three of these units are employed. The units are essentially duplicates of one another, although the windings may constitute right hand spirals or left hand spirals without altering the principle of operation, and right and left hand spiral coils may be employed in the same mechanism.

The variable inductance unit illustrated in Figs. 2 and 3 comprises a right hand spiral coil 91 of highly conductive wire, the wire being firmly wound into place upon a grooved insulating coil form 92. The coil form rigidly supports the coil and spaces the coil turns from one another.

An insulating block 93 is secured by screws 94 over one of the openings 54 in the upright wall 53 of the frame 51.

A conductive metallic guide plate 95 having a guide slot 96 formed in it, is attached upon the forward face of the block 93. A conductive rider 97 has its body portion received and guided in the slot 96, and is formed with oppositely extending arms 98 which rest upon, embrace and bear with spring pressure against points on the coil windings which are separated about 90° from one another. As the coil is turned it drives the rider along the slot 96. The rider is conductively engaged with the plate 95. The plate 95 is formed with two terminal ears 99 and 100 which extend through the block 93 and project rearwardly therefrom.

A spring finger 101 (Fig. 3) extends through the block 93 in contact with the ear 99 and bears against a conductive plate 102 which is affixed to the right hand end of the coil form 92 and is conductively connected to one end of the winding 91. Thus, the rider and the right hand end of the winding 91 are maintained at the same potential in the circuit.

The opposite end of the winding 91 is conductively connected to a conductive plate 103 which is affixed to the left hand end of the coil form 92. A finger 103*a* (see Fig. 2 also) is secured in the block 93, and has a terminal portion 104 which extends rearwardly from the block for connection in the circuit to be tuned.

The arrangement is such that the rider is caused to travel from right to left as the shaft 2 and the stop carrying gears 7, 8, and 8*a* to 8*h* are driven counter-clockwise, the direction which is consistently referred to herein as the direction of forward drive. Thus, as the parts are operated in a forward direction the effective portion of the coil which lies between the left hand end of the coil and the rider is progressively diminished in length, so that the effective inductance included in the circuit is progressively diminished. The apparatus could just as well have been designed to increase the effective inductance as the shaft is turned in the forward direction, but in the illustrative apparatus that is not the case. The other two inductance units (not shown) operate in harmony with the inductance unit which has been shown and described, progressively to diminish the effective inductance as the shaft 2 is turned in a forward or counter-clockwise direction.

The unit 3 is shown with the open sides of the frame member 51 facing upwardly and to the front. A cover plate 105 extends over the top of the tuner frame 51 and down at the front thereof. This cover plate is secured by screws 106 and 107 threaded into the frame 51. The unit 3 can, if desired, be turned in its entirety through 90° making the wall 52 a rear upright wall and the wall 53 a horizontal top wall. In such a case, the wall 52 would be attached to the posts 57 and 58 by the screws 59.

The driver gear 10 of the tuner shaft 2 is constantly engaged and driven by the gear 9 which is fast upon a shaft 111, this being the shaft upon which the broad pinion 6 is made fast.

The gear 9 is made fast with the shaft 111 by a set screw 112 which is threaded through the hub of the gear and into firm engagement with the shaft. The shaft 111 is supported in ball bearings 113 which are carried in the upright plates 18 and 19. Each ball bearing is held in place by a retaining plate 114 (Figs. 2 and 4) which is drawn toward the associated upright plate by screws 115. The pinion 6 is, as has been noted, normally in driving engagement with each of the gears 7, 8 and 8a to 8h inclusive. Each of these gears carries a single stop, the stops being designated 116 in the case of the timer gear 7, 117 in the case of the first or right hand selecting gear 8, and 117a to 117h in the case of the selecting gears 8a to 8h, respectively (Figs. 2 and 4). The gears 7, 8 and 8a to 8h, are in all respects duplicates of one another.

An individual carrier is provided for each of the gears 7, 8 and 8a to 8h. The carrier 14 for the gear 8 and the carriers for the other gears are in all respects duplicates of one another. A description, therefore, of the carrier 14 of the gear 8 will suffice for describing the carriers of all the gears.

All the carriers are mounted upon a round shaft 118 (Figs. 2, 7 and 12) which extends between the upright plates 18 and 19 and is held to them by screws 119. Each carrier comprises a pair of parallel plates 120. The plates are formed with square openings 121, the sides of the squares being substantially equal to the diameter of the shaft 118. The plates are revolubly mounted upon the shaft and are provided with the square bearings for a purpose which will be explained at a subsequent point.

The plates of a carrier are connected to one another at their lower corners by spacer rivets 122. They are also connected to one another at their upper corners by spacer rivets 123. At its forward corner the gear 8 is revolubly supported.

The gear 8 is interposed between spacing washers 124, which, together with the gear, just fill the space between the plates 120. A cylindrical bearing pin 125 has a driven fit with the gear and washers, and projects at its opposite ends beyond the washers to occupy square bearing openings 126 formed in the plates 120.

A bent plate 126a (Figs. 2, 4 and 7), extends across the machine between the upright plates 17 and 18, and is provided with down-turned ears 127 which are formed with notches 127a to embrace end portions of the shaft 118. The ears 127 are secured to the end plates 18 and 19 by screws 128. The down-turned rear end, 126b, of the plate 126a is formed with notches 126c (Figs. 4 and 12) in which spring wires 129 engage. Each spring wire 129 extends down over the forward face of the shaft 118 and engages beneath the spacing rivet 122 of an associated gear carrier. The springs rock the carriers about their pivots (the axis of the shaft 118) to urge the selector gears into engagement with the pinion 6. The springs serve also to urge their respective carriers upward and toward the front so that the shaft 118 is caused to contact the lower and rear faces of the square openings 121.

The upper end of the carrier 13 bears against a grooved rod 130 which extends between the upright plates 18 and 19. The rod 130 is secured to the plate 19 by a screw 131 and to the plate 18 by a reduced threaded end portion of a rod 132. The reduced threaded end portion of the rod 132 is passed through the plate 18 and is threaded into an end of the rod 130 (Fig. 4).

The rod 132 is formed with a polygonal enlargement 133 adjacent the plate 18, and extends toward the right into contact with the motor supporting plate 36, being secured to the plate 36 by a screw 134. The plates 122 of each carrier enter circumferential grooves 135, formed in the rod 130 and engage the rod in the bases of the grooves. The rod serves, therefore, both as a stop for determining the normal rotative position of the carrier and as an aliner for the carrier plates.

The advantage of all the square bearings will be hereinafter explained.

As has been previously mentioned, the setting of the stops for cooperating with the selector gear stops is controlled from keys 12 and 12a to 12h, inclusive, and the manual control key 15 is also provided.

Figure 14:
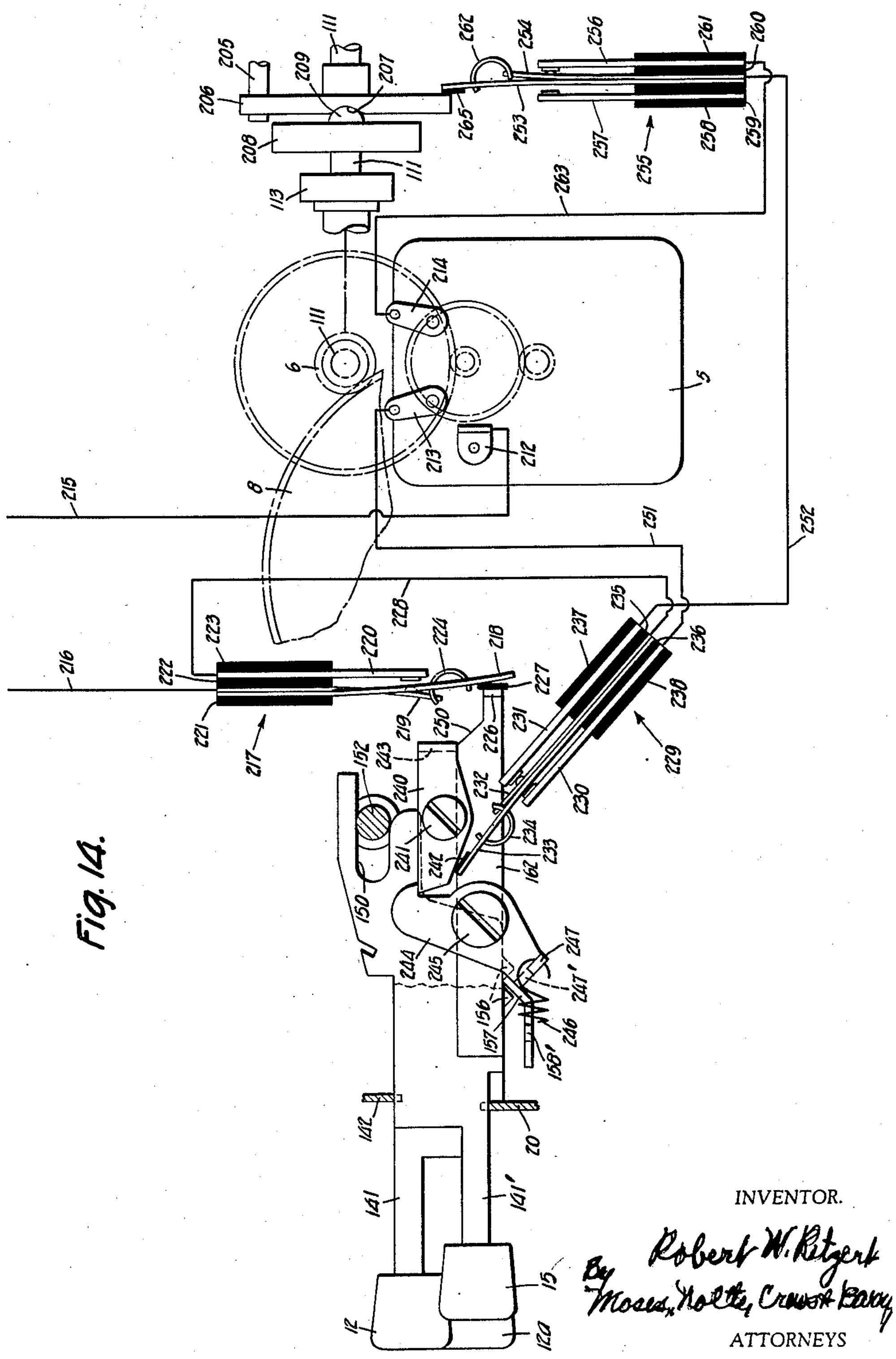
Fig. 14 is a diagrammatic view illustrating electrical motor operating circuits and the principal control elements therefor.

The key 15 is mounted upon a slide 141 (Figs. 1, 4 and 14). The slide 141 is guided by a notch formed in the upper edge of the plate 20 and an opposed notch formed in the lower edge of a plate 142.

The plate 142 is secured by screws 143 to a rectangular cross bar 144. The bar 144 is secured by screws 145 to the upright plates 17 and 18. The bar 144 is held firmly against turning. A rod 146 having rearwardly turned ends extends across the face of plate 142 so as to lie directly in front of a series of openings 147 formed in the plate. There is one of these openings for each of the keys 15, 12 and 12a to 12h, inclusive. The ends 148 of the rod 146 extend rearwardly through openings formed in the plate 142.

A tension coil spring 149 (Fig. 1) extends through one of the openings 147, and has one end disposed around the rod 146 to anchor the forward end of the spring. The rear end of the spring is connected to the slide 141′ upon which the key 15 is mounted.

Figures 5, 6, 7:
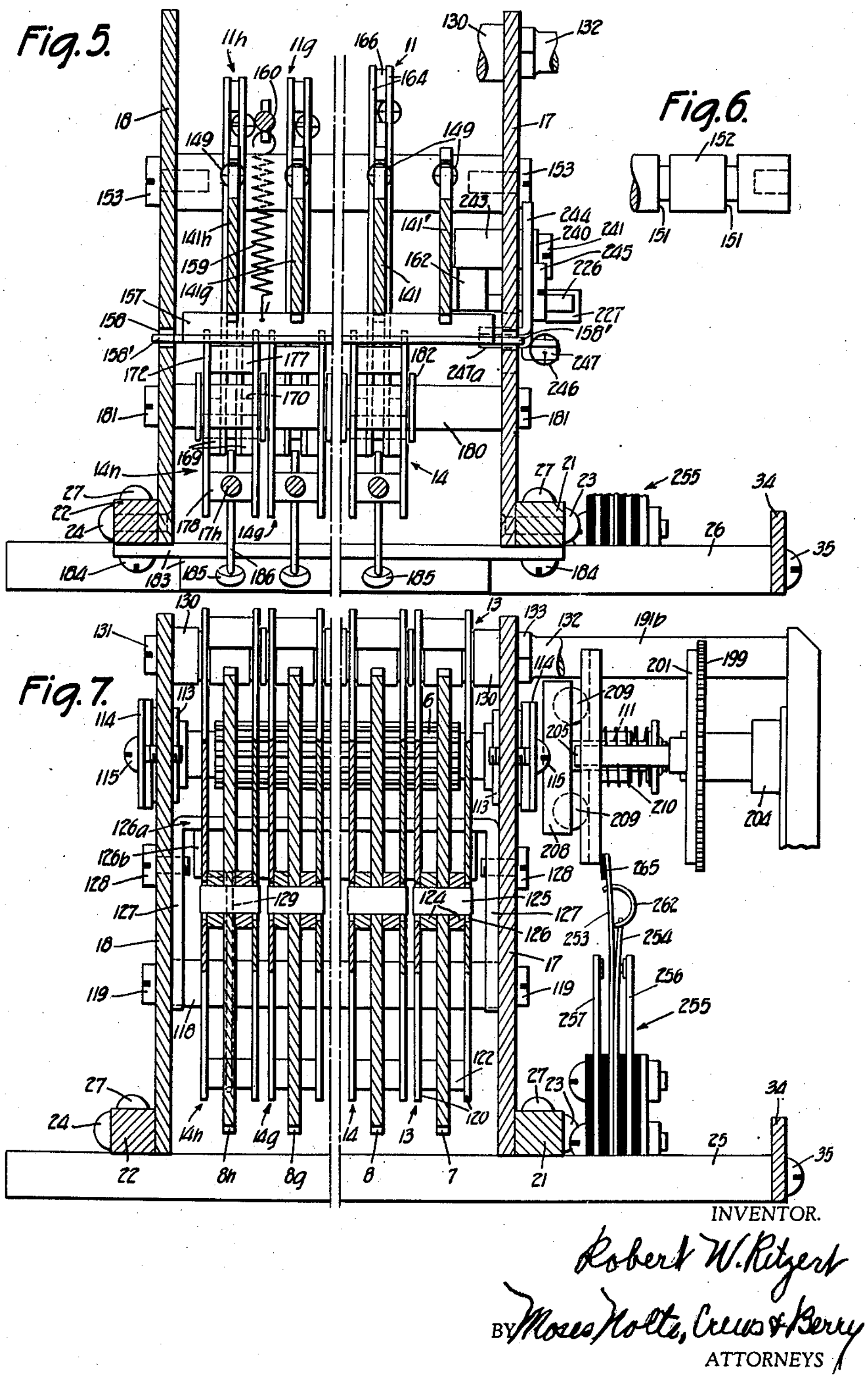
Fig. 5 is a vertical sectional view taken upon the line 5—5 of Fig. 2 looking in the direction of the arrows.
Fig. 6 is a detail fragmentary view of a guiding and arresting bar, the fragmentary showing of the bar in Fig. 6 being in alignment with the same bar as shown in Fig. 5.
Fig. 7 is a fragmentary sectional view taken upon the line 7—7 of Fig. 2 looking in the directional of the arrows.

The slide 141 is formed with a rearwardly opening slot 150, which receives a grooved portion 151 of a cross rod 152. The cross rod 152 extends between the plates 18 and 19, and is held to the plates by screws 153 (Fig. 5). The grooved rod serves to support the rear end of the slide 141, and also to cooperate with the notches in the plates 20 and 142 for guiding the slide in an assigned path.

As thus far described, the slide which carries the key 15 is the same as slides 141, 141a to 141h which are provided for carrying the keys 12 and 12a to 12h, inclusive. The only variation resides in the fact that the key stems take off alternately from the lower and upper margins of the slides. Thus the keys are arranged in two lines, the lower line including the key 15 and alternate keys of the station selecting set, while the upper line includes the other alternate keys of the station selecting set.

The slides 141, 141a to 141h for the station selector keys are also supported by grooved portions 151 of the rod 152 and by notches in the plates 20 and 142. These slides are also urged in a forward direction by tension coil springs 149.

Each of the slides 141, 141′, 141a to 141h is formed with a pointed projection 156 (Fig. 2), on its lower face for cooperating with a latch bar 157 (see Figs. 4 and 5 also). The latch bar is pivotally mounted in the plates 18 and 19 by having its end portions 158′ disposed in openings 158 formed in the plates. The latch bar is normally held up by a tension coil spring 159 so that its upturned rear end engages the lower faces of all the slides 141, the spring being connected to the rear end of the latch bar and to a fixed arm 160 which is carried by the rod 144 and extends rearwardly from the rod.

The normal positions of the slides 141 are the forward positions thereof. Each of the slides 141′, 141, 141a to 141h, has a shoulder 161 adapted to engage the rear wall of the plate 20 when the slide is pulled forward by the associated spring 149. The keys normally stand with their faces in substantially coplanar relation. When any one of the slides is thrust rearward by the key which it carries, it rocks the latch bar 157 in a clockwise direction to permit the projection 156 to pass over the edge of the latch bar. When the point of the projection has passed the latch bar, the latch bar springs upward again to engage the forward face of the projection 156 and thereby retain the slide in the rearward position to which it has been moved. Thus the key which is in control is identifiable by the fact that it is retained in a rearwardly displaced condition relative to the other keys.

When one of the key slides has been moved to and latched in a rearward position, the other key slides are still free to be operated. The thrusting of any one of them to the same rearward position, however, will rock the latch bar clear of the projection 156 of the slide first displaced, so that that slide will be immediately drawn by its spring 149 to its normal forward position. The slide which is being thrust to the rear, however, will be latched in its rearward position in the manner already described.

The slide 141′ which carries the key 15 differs from the other slides 141 and 141*a* to 141*h* in the fact that it has affixed to it a rearwardly extending thrust bar 162 (Figs. 1, 4 and 14), the purpose of which will be explained later. The slide 141′ of the key 15 has no station selecting stop associated with it. Each of the selector key slides 141 and 141*a* to 141*h* is connected, however, by a tension coil spring 163 to an upwardly extending tail portion 164 of one of the settable stops 11 and 11*a* to 11*h*, inclusive. The stops and the supports for them are all duplicates of one another, so that a description of one will suffice for all.

The stop 11, for example, comprises a pair of identically shaped plates 165. The shape of one of these plates is best illustrated in Fig. 2, where the stop 11 is shown in its effective station selecting position. At the upper ends of tail portions 164, the plates 165 are connected to one another in definitely spaced relation by spacer rivets 166. The tail portions extend upward from sector-like portions which at all times straddle the associated stop carrying gear 8.

In the normal or retracted position of the stop the plates stand outward beyond the path of the gear carried stop 117. When the settable stop is shifted to its rearward or set position, however, one of the plates 165 stands across the path of the stop 117 in position to arrest counter-clockwise movement of the stop 117. The stop face is designated 167 in Fig. 2, while the face 168 is a camming face, as will be explained presently.

The plates 165 at their lower ends have washers 169 disposed at opposite sides of them. A bearing pin 170 is passed through the washers and the plates and has a driven fit with each of them. The pin 170 projects at opposite sides beyond the washers to serve as bearings, the pin ends being received in square openings 171 of plates 172 which form parts of the stop carrier 176.

Each of the selector key slides 141, and 141*a* to 141*h* is formed at its forward end with a downwardly opening notch 173. A finger 174 at the forward boundary of the notch 173 extends down between the plates 165 of the stop. A spacing rivet 175 extends between the plates 165 and secures the plates together in fixed spatial relation in the slot area. The body of the rivet which lies between the plates is received in the slot 173, but is much narrower than the slot, so that there is provision for considerable lost motion between the rivet 175 and the associated slide 141.

In the forward position of a station selector slide, the finger 174 engages the rivet 175 to pull the settable stop forward and hold it out of engagement with the guiding and abutment rod 152. This places the spring 163 under tension. When a key slide 141 is thrust rearwardly, the rear end of the spring 163 is carried rearwardly by the slide, and the spring pulls the settable stop about the pivot defined by the bearing pin 170 and the square bearing 171 into engagement with the rod 152. This is the rear or set position of the stop in which one of the plates 165 extends across the path of the gear carried stop 117.

If at the time when the stop is set in this rearward position, the gear carried stop 117 is disposed in a counter-clockwise direction from the stop 11, the gear 8 will have to be operated in a clockwise direction to a limiting position, and then operated counterclockwise until it is intercepted and arrested by engagement with the stop 11. During such clockwise operation, the stop 117 engages the surface 168 of one of the plates 165 to rock the stop 11 counter-clockwise against the tension of the spring 163. As soon as the stop 117 has passed clear of the surface 168, the spring 173 immediately restores the stop to its rearward or set position. When the gear 8 is subsequently operated counter-clockwise, the stop 117 is carried against the surface 167 and the gear is positively arrested in a predetermined position.

The plates 172 of each stop carrier 176 are substantially triangular in form. The settable stop is pivotally mounted in the rear corner of the carrier. The upper forward corners of the carrier are connected to one another in definitely spaced relation by spacer rivets 177. The lower forward corners are similarly connected together in definitely spaced relation by spacer rivets 178. The plates 172 are formed with square openings 179. A stationary shaft 180 extends through the square openings and forms a pivotal support for the carriers. The shaft 180 is connected to the plates 18 and 19 by screws 181. Collars 182 mounted upon the shaft 180 space the carriers from one another.

A plate 183 (Figs. 2 and 7) is affixed by screws 184 to the under side of bars 21 and 22. The plate 183 has a downturned rear margin through which openings 185 are formed. Each opening 185 receives one end of a leaf spring 186. The opposite end of the leaf spring extends under stress around the forward edge of the plate 183 and engages behind the spacer rivet 178 at the forward lower corner of one of the stop carriers 176. One of the vernier adjusting screws, for example 17, is threaded through a plate 188 to bear against the rivet 178 in opposition to the spring 186.

The plate 188 is secured to the rear face of bar 25 by screws 189 and extends upward from the bar 25. The slotted head of the screw 17 is accessible through an opening 190 formed in the plate 20. The slotted heads of similar screws 17*a* to 17*h*, inclusive, are similarly made accessible through openings 190*a* to 190*h* formed in the plate 20. The holes 190 and 190*a*–190*h* are of smaller diameter than the heads of screws 17 and 17*a*–17*h*. By this means a mechanical limit is put on the counter-clockwise rotation of the screws. This prevents the screws from becoming disengaged or allowed to go beyond their normal travel.

The function of each spring 186 is to hold the associated spacer rivet 178 firmly against one end of the vernier screw which engages it. Screwing in of the vernier screw 17 rocks the carrier 176 in a counter-clockwise direction about the axis of shaft 180, and serves thereby to lift the stop 11 (as in Fig. 13), and particularly the surface 167 thereof which stands in the path of gear carried stop 117. Retraction of the vernier screw obviously has the opposite effect, since the spring 186 causes the rivet 178 to maintain constant engagement with the end of the screw.

As has already been indicated, a reversible motor 5 is provided for driving the tuner and the stop carrying gears. Also, as previously noted, the motor is carried by a flanged plate 36. The plate 36 is supported at its four corners. It is attached at its two lower corners to the bar 34 by screws 191 (Figs. 1 and 3). The attachment of the plate at its upper forward corner to the rod 132 by the screw 134 has already been described. A screw 191*a* connects the upper rear corner of the plate 36 to a rod 191*b*. The rod 191*b* has a reduced threaded end screwed into the plate 18. The motor 5 is secured to the plate 36 by bolts 192 and nuts 193.

The motor shaft 4 (Figs. 1 and 3) has fixed upon it a pinion 195 which drives a gear 196 supported upon a stub shaft 197. A pinion 198, fast upon the pinion 196, drives a large gear 199 which is revolubly mounted upon a shaft 200, the shaft 200 being rigidly supported in the plate 36. The gear 199 has affixed to it a disc 201. A split ring 202 lodged in a groove of the shaft 200 bears against the disc to press the gear hub 203 against a shoulder formed on a flange of shaft 200.

A pin 205 (Fig. 2) is carried rigidly by the disc 201 and extends leftward therefrom (Fig. 3), and through a pole 206*a* in a clutch disc 206. The clutch disc 206 is revolubly mounted upon the right-hand end of the shaft 111 of the pinion 6. The clutch disc is formed with a diametrically extending groove 207 in its left-hand face. A thick disc 208, fast on shaft 111, carries a pair of steel balls 209 which are normally engaged in the groove 207 as in Fig. 14, to effect a driving connection from the disc 206 to the disc 208, and thence through the shaft 111 to the pinion 6 and the gear 9.

The grooved disc 206 is urged toward the pawl carrying disc 208 by a compression coil spring 210 (Fig. 3), which bears at its left-hand end against the disc 206 and at its right-hand end against a collar 211. A split ring 212 lodged in a groove at the right-hand end of shaft 111 supports the collar 211 against the end thrust of the spring 210. The purpose of the yielding drive which is effected through the described clutch mechanism will be made apparent when the operation of the motor is described.

The motor is provided with three terminals 212, 213 and 214, (Figs. 1, 3 and 14). The terminal 212 is constantly connected to a line conductor 215. The terminals 213 and 214 may alternatively be connected through mechanism to be described with the other line conductor 216. When the terminal 213 is in circuit, the motor is driven in a counter-clockwise direction, driving the tuner shaft and the stop carrying gears in the backward or clockwise direction.

Conductor main 216 is connected to a snap-over toggle switch 217 of a well known type. This switch as illustrated comprises three conductive arms 218, 219 and 220. The arms 218 and 219 are in conductive contact with one another and are anchored at their fixed ends between insulating blocks 221 and 222. The corresponding end of the conductor 220 is anchored between insulating block 222 and a further insulating block 223. The conductor 220 is rigid and carries a fixed contact, while the conductor 219 is flexible and carries a movable contact. The conductor 218 constitutes a flexible actuating arm which is formed with a cut-out through which the free end of conductor arm 219 plays. The conductors 219 and 220 carry cooperative contacts. A semicircular spring 224 engages at its opposite ends with the conductors 218 and 219 and is held under compression by them.

As illustrated in Fig. 14, the free end of conductor 218 is thrust to the right. The effect of this displacement of the arm 218 is to cause spring 224 to thrust the free end of conductor 219 toward the left, so that the contact carried by conductor 219 is disengaged from the contact carried by the conductor 220. When the free end of the conductive arm 218 is permitted to move to the left, it crosses the line of centers of the springs and causes the free end of conductor 219 to be snapped over toward the right for completing the circuit.

The thrust bar 162 affixed to the slide 141′ of the manual tuning key 15 is formed with a side arm 226 (Figs. 1, 4 and 14), which extends through an opening 225 in the upright plate 18. An insulating block 227 secured on the end of the arm 226 engages the free end of the arm 218 and thrusts it rearwardly as the key 15 is thrust rearwardly from the position in Fig. 1 to that of Fig. 14, to make manual tuning available. So long as the key 15 is retained in its rearward position, the switch 217 is held open, as shown in Fig. 14, and the motor is incapacitated. At the same time none of the settable stops (117, and 117*a* to 117*h*) is in its effective rearward position, so that the full range is freely available for manual tuning.

The conductor 220 of switch 217 is connected by conductor 228 (Fig. 14) to a motor reversing switch 229. This switch is similar to the switch 217, but differs in that instead of having merely open and closed positions, it is adapted to close either of two circuits alternatively. The switch comprises two rigid contact carrying conductors 230 and 231 (see Fig. 1 also), a flexible contact carrying conductor 232, a flexible operating arm 233, and a stressed semi-circular spring 234. The conductive members 232 and 233 are in conductive engagement with one another and are connected to the conductor 228. They are separated from the conductor 231 by an insulating block 235 and from the conductor 230 by an insulating block 236. Insulating blocks 237 and 238 are secured at the outer sides of the conductors 231 and 230, respectively.

Figure 9:
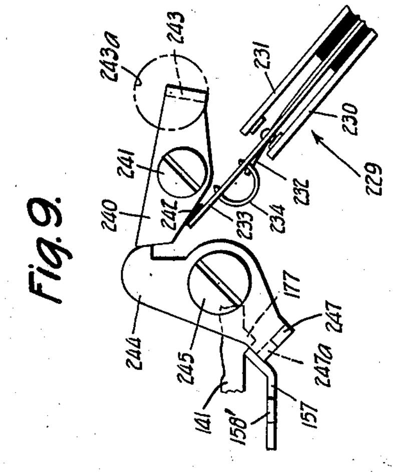
Fig. 9 is a fragmentary detail view showing the position of a certain pawl and lever mechanism and a motor reversing switch controlled thereby immediately after the operation of the key in Fig. 8.

The principle of operation of the switch 229 is precisely the same as that of the switch 217. When the arm 233 is moved to the left (as in Figs. 1 and 14), the flexible conductor 232 is thrust to the right to move its contact into engagement with the contact carried by rigid arm 231. When the force displacing the arm 233 to the left is removed, the arm moves to the right under its own power (as in Fig. 9), and causes the spring 234 to snap the flexible conductor 232 over to the left so that the conductor 232 carries its contact into engagement with the contact carried by rigid conductor 230.

As the parts are shown in Fig. 14, the flexible arm 233 is displaced toward the left by a lever 240 which is carried upon a pivot screw 241, the pivot screw in turn being mounted upon the upright plate 18. The under face of the forward end of the lever 240 is shown pressing against the flexible arm 233 through an insulating block 242 which is secured upon the free end of the flexible arm. The rear end of the lever 240 includes a finger 243 which extends through a hole 243a in the plate 18 and rests upon a relatively high surface of the thrust bar 162 of the manual tuning key slide.

A pawl 244 carried on a pivot screw 245 which is affixed to the plate 18 is urged clockwise by a tension spring 246. The spring 246 is connected to the tail of the pawl and to an upper portion of the plate 20. The pawl, as shown in Fig. 14, has its nose caught over the forward end of the lever 240. The pawl serves to hold the lever against the action of spring arm 233 when the slide 141' is returned to its normal position shown in Fig. 1. In the positions of the parts illustrated in Fig. 14, the flexible arm 233 is displaced far enough to the left by the lever 240 to throw the contact arm 232 over to the right, so that the contacts carried by arms 232 and 231 are in engagement with one another. There is no point in tracing out the circuit, however, since with the parts in the conditions shown in Fig. 14 the switch 217 stands open.

As soon as one of the station selecting keys is thrust rearward, however, the latch bar 157 is rocked clockwise, as has already been explained. In the course of such movement the latch bar engages a tail portion 247a of the pawl 244 (Figs. 1, 4 and 14) which extends through an opening 247' in the plate 18. The latch bar acts upon the tail portion 247 to rock the pawl counterclockwise. Since, at the same time, the slide 141' which carries key 15 is pulled forward by its spring 149, the high part of thrust bar 162 is withdrawn from beneath the lever 240, the forward end of the lever 240 is left unsupported, and the lever is rocked in a clockwise direction by the force of the flexible arm 233 of the switch 229 to the position in Fig. 9. This permits the switch arm 233 to move far enough to the right to cause the flexible arm 232 to be swung over to the left. Such operation, of course, carries the contact of arm 232 into engagement with the contact of arm 230.

The latch bar 157 is rocked clockwise only momentarily as an incident of the thrusting rearward of one of the station selector keys. In that moment, however, the lever 240 is released by the pawl 244 and moves into position where its rear end cannot again be caught and held down by the nose of the pawl. When the latch bar 157 resumes its normal position, the pawl 244 seeks to regain its former position, but it engages instead against an end face of the lever 240, as in Fig. 9.

When the key 15 is again thrust rearward, the pawl is rocked counter-clockwise as before. An inclined surface 250 of the thrust bar 162 lifts the rear end of the lever 240, depressing the forward end of the lever 240, so that when the latch bar 157 leaves the pawl free to rock clockwise again, the pawl can move in over the corner of the lever.

Since the motor cannot operate with the parts in the condition shown in Fig. 14, because the switch 217 is open, it will now be assumed that one of the station selector keys is thrust rearwardly, so as to release the key 15 and restore it to its normal position. This causes the switch 217 to be closed and the circuit to be continued through conductor 228, switch members 232 and 230 of motor reversing switch 229, conductor 251, motor terminals 213 and 212, and line conductor 215. This completes the circuits for operating the motor backward.

As the motor drives the selector gears backward (i. e. clockwise), the rider 97 which cooperates with the coil 91 moves toward the right. As the rider nears its right-hand limit of movement, the stop 116 on timer gear 7 engages the tail 243 of lever 240, as in Fig. 10, causing the forward end of the lever 240 to push the flexible arm 233 of switch 229 to the left. By the time the flexible arm 233 has reached the position in which it is illustrated in Fig. 14 it will have caused the switch arm 232 to snap over into conductive engagement with the contact carried by rigid arm 231. This reverses the motor energization.

The rigid switch arm 231 is connected to a conductor 252 which, in turn, is connected to the flexible arms 253 and 254 of a switch 255.

The switch 255 includes rigid conductors 256 and 257 and insulating blocks 258, 259, 260 and 261. A semi-circular spring 262 is compressed between the arms 254 and 253. The switch is exactly like the switch 229 except that the rigid conductor 257 is a mere dead end, not being connected to anything.

In the normal operative condition of the parts, the arm 253 is biased to the left by its own force and acts through the spring 262 to force the flexible arm 254 toward the right as in Fig. 14. The circuit traced through conductor 252 is, therefore, continued through conductors 254 and 256 and a conductor 263 to the motor terminal 214. From the motor terminal 214 the current passes through the motor to the terminal 212 and thence to line conductor 215.

Figure 10:
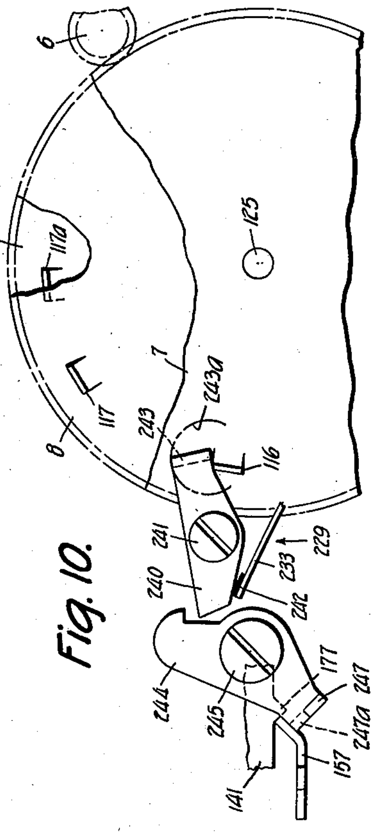
Fig. 10 shows the same pawl and lever mechanism together after the stop carrying gears have been driven in a clockwise direction from the position shown in Fig. 8, the parts being operated to effect the reversal of the motor.

The motor drive is reversed by the action of the switch 229 before the stop 116 has reached the position illustrated in Fig. 10 in which it would be positively arrested by the lever 240. As illustrated in Fig. 10, the finger 243 at the rear end of the lever 240 is in engagement with the upper edge of the opening 243a of the plate 18 through which the finger 243 extends. In actual practice this position will never be attained under power operation, because the motor will previously have come to rest and started to operate in the opposite direction. The exact point of reversal with reference to the operating range of the inductive tuner is not important, so long as reversal occurs within the range and near enough to one limit of the range, to avoid the wasting of a substantial part of the available range.

At the time of motor reversal, all of the station selector stops carried by the station selector gears are disposed clockwise from the positions in which they are adapted to be arrested by their cooperative settable stops. That is to say, all of them are operative in a counterclockwise direction by the motor to or beyond the arresting position.

When the motor has been reversed as described, it continues to operate in the direction to drive the tuner and the stop carrying gears forward until one of the gear carried stops engages the settable stop which is at the moment set in effective position to arrest operation of the gears, the motor and the tuner. In Fig. 2, the stop 117 on gear 8 is shown in engagement with the surface 167 of the settable stop with which it cooperates to perform such an arresting function. At this point a station selecting cycle has been completed and the tuner has been tuned to the frequency of the station designed to be brought in by operation of selector key 12.

When the stop carrying gears, the pinion 6 and the tuner have been arrested as just described, the motor is permitted to overthrow relative to the gearing, and is caused as an incident of such overthrow to be open-circuited. It will be remembered that the grooved disc 206 is urged toward the ball carrying disc 208 by a spring 210 (Fig. 3), and that the balls 209 normally rest in the groove 207 of the disc 206, as in Fig. 14.

When the disc 208 is abruptly arrested, the inertia of the motor and of the operating train from the motor to the disc 206 causes the disc 206 to continue to turn. Since the balls 209 are held in place by the now stationary disc 208, the groove 207 rides off the balls, from the position shown in Fig. 14 to the position in Fig. 3, so that balls displace the disc 206 to the right against the compressive force of spring 210. The flexible arm 253 of switch 255 carries an insulating block 265 (see Fig. 2 also) which normally bears lightly against the right-hand face of the disc 206 as illustrated in Fig. 14. In this position the disc 206 has no effect upon the arm 253, and the arm is biased toward the left as previously described to maintain the arm 254 swung over to the right, also as previously described.

As soon as the disc 206 turns relative to the disc 208 to bring about the physical separation of the discs illustrated in Fig. 3, the disc 206 will have moved the arm 253 toward the right to the position illustrated in Fig. 3, thereby causing the switch arm 254 to be swung to the left-hand position to open the forward driving circuit of the motor. The parts retain these positions, as illustrated in Fig. 3, until another station selector key has been thrust to the rear.

The pawl 244 (Fig. 14) and lever 240 retain the switch 229 in the condition illustrated in Fig. 14, so that backward drive of the motor is also impossible.

When another station selector key is thrust to the rear, the latch bar 157 is tilted, rocks the nose of pawl 244 clear of the forward end of lever 240, and permits the lever 240 to be swung clockwise by the spring arm 233. This reverses the switch 229, and since in driving the motor backward the current is not required to flow through the now open switch 255, the backward driving of the motor begins.

The first effect of such backward driving is to carry the groove 207 around into position to receive the balls 209, thereby reestablishing the normal condition of the clutch and the closed condition of the switch 255. When the backward driving in the performance of the cycle now being described reaches the reversal point, the switch 229 is reversed. The switch 255 having been restored to a closed condition as an incident of the backward drive, the reversal of the switch 229 is now effective to cause the motor to be driven forward.

Figure 8:
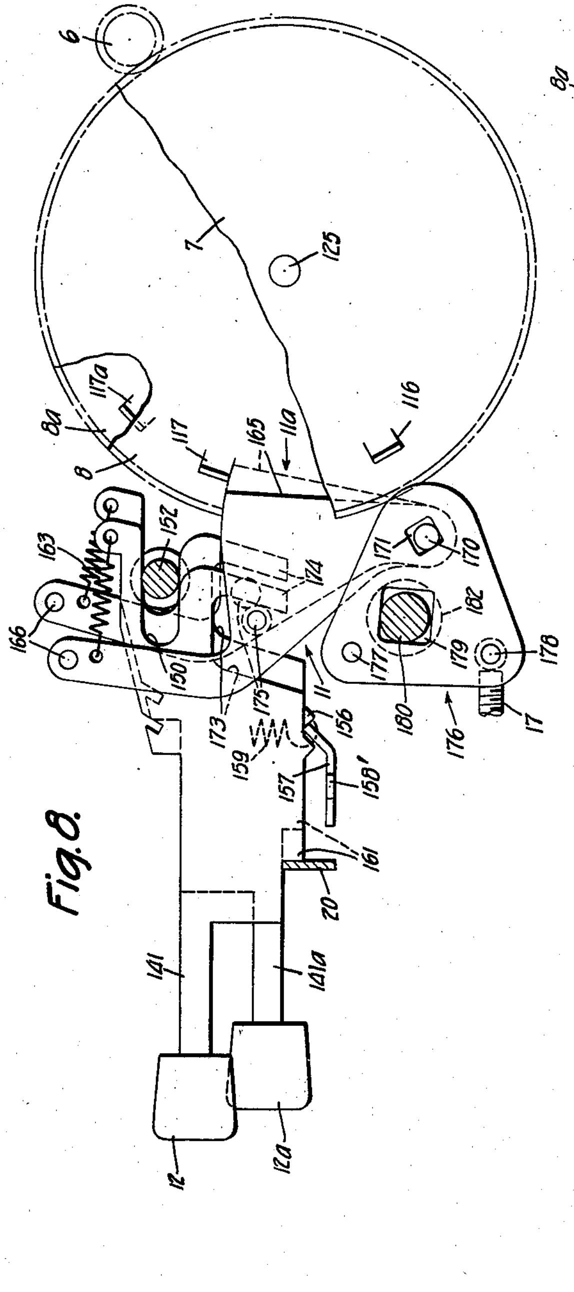
Fig. 8 is a fragmentary sectional view showing the first two of the station selector keys seen in Fig. 2 and the mechanism operated by them, the second key being set in effective position, and the previously set key being released and restored, the stop carrying gears being still in the position of Fig. 2 but about to be rotated in a clockwise direction.

As the parts are illustrated in Fig. 2, a station has been selected by the rearward actuation of key 12. As the parts are illustrated in Fig. 8, that selection has not yet been disturbed, but the key 12a has been thrust rearward for the purpose of causing a station to be selected by the engagement of the stop 117a of gear 8a with its cooperative settable stop 11a. The parts are illustrated in Fig. 8 just as the key 12a has been thrust rearward and the stop 11a has been set, but before there has been any movement of the station selecting gears.

The first consequence of the operation of selector key 12a will be to cause the station selecting gears to be turned clockwise until the stop 116 of gear 7 has engaged and operated the lever 240 to effect motor reversal (Fig. 10). The selector gears are then driven counter-clockwise until the stop 117a of gear 8a is arrested by engagement with the upper surface of the settable stop 11a as in Fig. 11.

In setting up the machine for operation, the following procedure is practiced: First, the manual tuning button 15 is pressed rearwardly, so as to disable the motor, by opening the switch 217. The carrier 13 of timer gear 7 is then swung counter-clockwise until the gear has been moved out of engagement with the pinion 6. A spacer 266 (approximately ⅛ inch thick) is then inserted between the carrier and the rod 130 (as in Fig. 12) to retain the gear 7 near to, but clear of engagement with, the pinion 6. Through the manual tuning knob 16 the inductive tuner is next operated backward to its limit of movement as determined by the arresting of finger 75 by the lower side of stop arm 76 (Fig. 2). The timing gear 7 is next operated backward until the stop 116 is positively arrested by the lever 240 with the parts in the relative positions illustrated in Fig. 10. The spacer block 266 is then removed to permit the gear 7 to reengage the pinion 6.

In order to set the mechanism for selecting a predetermined station, the operator proceeds as follows: He first presses the manual tuning button to render the motor inoperative and to make sure that no settable stop is in position to interfere with manual operation of the tuner and the selector gears. He next manually tunes in the desired station until the reception is as clear as can be obtained.

Assuming that the key 12 is to be used in this instance, the station selector gear 8 is next disengaged from the pinion 6 in the manner previously described with reference to the timer gear. The spacer 266 is inserted in place to hold the gear 8 clear of engagement with the pinion 6. The freed station selector gear is next rotated in a forward direction until the bottom edge of the stop 117 is parallel to the upper edge of the suitable stop 11a. At this time, however, the stop 11a is not set, since the manual tuning key is in control. The spacer block is next removed to permit the gear 8 to reengage the pinion 6. The unit is now ready for push-button operation and the key 12 is, therefore, actuated to test out the accuracy of the automatic station selection. If, as is probable, the station is not brought in automatically to the best advantage, the associated vernier screw 17 is operated to perfect the tuning.

The timing gear requires to be set just once. The station selecting adjusting is to be repeated for each key that is to be used for the automatic selection of a station. The vernier adjustment for each selector train is made just once.

The advantage of employing square bearings for round shafts in the several instances illustrated herein resides in the fact that precision of operation may be realized, and this without the necessity for observing troublesomely fine manufacturing tolerances. The function of the automatic tuning mechanism is to assure that each time a given station selector key is operated, the tuner will be automatically tuned within practical limits of error to the same frequency. Since a vernier adjusting means is provided in connection with each station selecting train, the important thing is not that the axes of the various shafts shall occupy predetermined positions, but rather that the axes of the shafts shall uniformly occupy precisely determined positions. Any initial error can be compensated by adjustment of the vernier mechanism, but once trains have been set up for selecting desired stations and the vernier adjustments have been made, there must be no avoidable variation of response.

When a round shaft is mounted in a round bearing, manufacturing tolerances must be provided. The shaft is necessarily free to have a slight planetary movement, so that the position of its axis is not precisely determined. Even though the shaft be biased toward one side of its round bearing, the bias toward a precisely determined position is not pronounced.

When a round shaft is mounted in a square opening, however, and is urged toward a definite corner of the opening, the distance of the shaft axis from such corner is definite and uniform, and hence the position of the shaft axis relative to the plate in which the square opening is formed is precisely determined, no matter what tolerances may have been employed in the manufacture of the shaft and in the cutting of the square opening. Precision is not required throughout the operation of the parts, but it is required at the conclusion of a station selecting operation.

In actual practice, of course, it is easy to cause the square openings to fit the shafts reasonably closely. The play of the shafts in the square openings is greatly exaggerated in the drawing simply for the purpose of making visually manifest the fact that some freedom may be tolerated and is present. Since each shaft will be held operatively near to its assigned position, it is not necessary, during operation, that a given shaft be urged constantly toward a prescribed corner of the square opening, so long as it is urged toward such corner at the conclusion of a station selecting operation.

The timer gear is only required to reverse the motor within the operative range of the tuner and near one limit of operation of the tuner. There is nothing exacting about the operation and construction of the timer gear. Its carrier is made like the carriers of the station selecting gears only because it is cheaper to duplicate the selecting gear carriers than it is to provide a special carrier designed for the timer gear. The mounting duplicates that of the selector gear carriers for the same reason. There is no vernier adjusting mechanism for the timer gear.

The limiting action of the station selector gears must, on the other hand, be as precise as possible. The gear carrier of each station selector gear is urged upward and forward by its spring 129, so that the lower and rear sides of the square opening 121 always engage the shaft 118. The spring 129 also urges the carrier in a clockwise direction about the axis of shaft 118 and into engagement with the bases of the grooves formed in the shaft 130. An unvarying position for the carrier is, therefore, determined.

In the arrested position of the gear 8, as illustrated in Fig. 2, the pinion 6 applies its driving force at the rear upper side of the gear in an upward and forward direction. The arresting force of the set stop 11 is applied through stop 117 in an upward and slightly rearward direction. The resultant of these forces urges the gear carrying pin 125 toward the upper corner of the square opening 126 in which it is revolubly mounted. The position of the gear and its relation to the pinion 6 are, therefore, definitely determined.

Similarly, the supporting pin 170 of the stop 11 is urged toward the lower corner of the square opening 171 of the stop carrier 176, while the upper forward corner of the opening 179 of the carrier is urged toward the axis of the shaft 180. The positions of all these parts at the conclusion of a station selecting operation are, therefore, invariably the same. The securement of exactly the desired frequency is, as has been previously pointed out, dependent upon the once performed setting of the vernier adjusting screw.

The angular bearing openings have been referred to as square because they have been illustratively shown as square. Broadly the same principle would apply whether the bearing surfaces be round or straight, so long as the bearing engages the shaft at only two points which are separated from one another by an angle of substantial magnitude.

I have described what I believe to be the best embodiment of my invention. I do not wish, however, to be confined to the embodiments shown, but what I desire to cover by Letters Patent is set forth in the appended claims.

I claim:

1. In a rotor setting mechanism, in combination, a settable rotor, a reversible motor, a drive train operated by the motor and positively connected to operate the rotor, a series of stop carrying rotary members, said train including a gear member connected to drive said rotary members in unison, individually settable stops cooperative with the respective operated stops carried by the rotary members, spring means for yieldingly retaining each of the settable stops when set in its set position, each settable stop having a cam face through which it may be momentarily cammed aside by the cooperative operated stop when the latter is driven in a first direction, an abrupt face adapted to intercept the cooperative operated stop, when the latter is driven in the opposite direction, for effecting station selection, a setting key for each settable stop, and motor control mechanism responsive to the operation of any such setting key including switch and circuit mechanism for first actuating the motor to drive the operated stops in the first direction until a limit of movement has been reached in which all the operated stops are in back of the rotor setting positions, reversing mechanism effective at such limit for reversing the direction of motor operation to cause the motor to drive the operated stops in the second direction until operation of the drive train is arrested by the set stop, and switch actuating mechanism responsive to the inertia of the motor upon arrest of the drive train to deenergize the motor.

2. In a rotor setting mechanism having a settable rotor operable through a limited range, in combination, a reversible motor, a drive train operated by the motor and positively connected to operate the settable rotor, a series of stop carrying rotary members positively driven by said train, individually settable stops cooperative with the respective operated stops to arrest operation of the settable rotor, a setting key for each settable stop, and motor control mechanism responsive to the operation of any such setting key including forward and backward driving circuits, a reversing switch for alternatively closing the respective circuits, mechanism operated by the motor to limit backward operation by operating the reversing switch when a backward limit is reached in which all of the operated stops are in back of the rotor setting positions, a slip drive connection between the motor and said drive train, a disabling switch included exclusively in the forward driving circuit, mechanism responsive to relative rotation of the motor and the drive train when the drive train is arrested to open said disabling switch, means for retaining the reversing switch in its forward driving position at the conclusion of a station selecting operation so that the motor can be driven in neither forward nor backward direction, and mechanism responsive to the setting of another station selecting key to cause the reversing switch to be operated to reestablish the backward driving circuit.

3. In a rotor setting mechanism having a settable rotor operable through a limited range, in combination, a reversible motor, a drive train operated by the motor and positively connected to operate the settable rotor, a series of stop carrying rotary members positively driven by said train, individually settable stops cooperative with the respective operated stops to arrest operation of the settable rotor, a setting key for each settable stop, and motor control mechanism responsive to the operation of any such setting key including forward and backward driving circuits, a reversing switch for alternatively closing the respective circuits, mechanism operated by the motor to limit backward operation by operating the reversing switch when a backward limit is reached in which all of the operated stops are in back of the rotor setting positions, a slip drive connection between the motor and said drive train, a disabling switch included exclusively in the forward driving circuit, mechanism responsive to relative rotation of the motor and the drive train when the drive train is arrested to open said switch, means for retaining the reversing switch in its forward driving position at the conclusion of a station selecting operation so that the motor can be driven in neither forward nor backward direction, and mechanism responsive to the setting of another station selecting key to cause the reversing switch to be operated to reestablish the backward driving circuit, the mechanism responsive to relative rotation of the motor and the drive train and the disabling switch itself being constructed and arranged to cause the disabling switch to be closed as an incident of such backward drive, so that the forward drive may follow at the limit of backward drive.

4. In a rotor setting mechanism which includes a motor, a drive train operated by the motor, and a series of stop carrying gears driven by the drive train, in combination, a series of pivotally mounted individually settable stops cooperative with the respective operated stops to arrest operation of the drive train, a key carrying slide associated with each settable stop, each slide constructed and arranged positively to move the associated stop away from setting position when moved in one direction, a tension spring connected at its forward end to the stop and at its rear end to the slide for exerting a yielding rearward pull upon the settable stop to move the stop yieldingly to set position when the associated slide is displaced rearwardly, stationary abutment means for limiting rearward movements of the settable stops, and latch mechanism for retaining the slides in rearwardly displaced positions.

5. In a rotor setting mechanism which includes a motor, a drive train operated by the motor, and a series of station selecting stop carrying gears driven by the drive train, in combination, a series of pivotally mounted individual settable stops cooperative with the respective operated stops to arrest operation of the drive train, a key carrying slide associated with each settable stop for setting the same, each settable stop comprising a pair of plates secured at a fixed distance from one another, said settable stop normally embracing the associated slide and the associated stop carrying gear.

6. In a rotor setting mechanism which includes a motor, a drive train operated by the motor, and a series of stop carrying gears driven by the drive train, in combination, a series of pivotally mounted individually settable stops cooperative with the respective operated stops to arrest operation of the drive train, a pivotally mounted carrier for each of the settable stops upon which the stop is pivotally mounted, a spring engaging each carrier to urge it in one direction about its mounting pivot, a screw engaging the carrier in opposition to the spring, and a stationary supporting member through which the screw is threaded, said screw being adjustable to change micrometrically the set position of the stop.

7. In a rotor setting mechanism which includes a motor, a drive train operated by the motor, and a series of stop carrying gears driven by the drive train, in combination, a series of pivotally mounted individually settable stops cooperative with the respective stops, to arrest operation of the drive train, a pivotally mounted carrier for each of the settable stops upon which the stop is pivotally mounted, a spring engaging each carrier to urge it in one direction about its mounting pivot, a screw engaging the carrier in opposition to the spring, and a stationary supporting member through which the screw is threaded, said screw being adjustable to change micrometrically the set position of the stop, said carrier being supported through an angular bearing upon a round shaft and said settable stop having a round shaft supported in an angular bearing of the carrier.

8. In a rotor setting mechanism which includes a motor, a settable rotor, and a drive train operated by the motor and positively connected to drive the settable rotor, in combination, a broad pinion positively driven by said drive train, a series of stop carrying selector gears normally in mesh with the pinion, a shiftable carrier for each selector gear, and spring means urging each carrier in a direction to carry its associated selector gear into mesh with the pinion.

9. In a rotor setting mechanism which includes a motor, a settable rotor, and a drive train operated by the motor and positively connected to drive the settable rotor, in combination, a broad pinion positively driven by said drive train, a series of stop carrying selector gears normally in mesh with the pinion, a shiftable carrier for each selector gear, spring means urging each carrier in a direction to carry its associated selector gear into mesh with the pinion, and a stationary arresting rod in the paths of the carriers.

10. In a rotor setting mechanism which includes a motor, a settable rotor, and a drive train operated by the motor and positively connected to drive the settable rotor, in combination, a broad pinion positively driven by said drive train, a series of stop carrying selector gears normally in mesh with the pinion, a shiftable carrier for each selector gear, and spring means urging each carrier in a direction to carry its associated selector gear into mesh with the pinion, each carrier including a pair of parallel plates secured together at a fixed distance from one another, and a stationary arresting rod in the paths of the carriers, having grooves for receiving the plate edges to determine and maintain the operative attitudes of the carriers.

11. In a motor setting mechanism which includes a motor, a settable rotor, a tuner, and a drive train operated by the motor and positively connected to drive the settable rotor, in combination, a broad pinion positively driven by said drive train, a series of stop carrying selector gears normally in mesh with the pinion, a shiftable carrier for each selector gear, spring means urging each carrier in a direction to carrying its associated selector gear into mesh with the pinion, each carrier including a pair of parallel plates secured together at a fixed distance from one another, and a stationary arresting rod in the paths of the carriers, a round shaft supporting the carriers, the carriers having angular bearing openings receiving the shaft and also having angular bearing openings for the selector gears, the selector gears being provided with round shafts.

ROBERT W. RITZERT.

REFERENCES CITED

The following references are of record in the file of this patent:

UNITED STATES PATENTS

| Number | Name | Date |
|---|---|---|
| 2,153,865 | Gersch | Apr. 11, 1939 |
| 2,244,541 | Marvel | June 3, 1941 |
| 2,285,414 | Collins | June 9, 1942 |
| 2,334,724 | Paessler | Nov. 23, 1943 |
| 2,423,588 | Elliott | July 8, 1947 |